United States Patent [19]

Ammann et al.

[11] 4,185,913

[45] Jan. 29, 1980

[54] APPARATUS FOR RECORDING MULTIPLE, SUPERIMPOSED, INDEPENDENT IMAGES ON MICROFILM

[75] Inventors: Stephan K. Ammann, Cupertino; Siegfried H. Mohr, Santa Clara, both of Calif.

[73] Assignee: Quantor Corporation, Mountain View, Calif.

[21] Appl. No.: 860,802

[22] Filed: Dec. 15, 1977

[51] Int. Cl.² .................. G03B 27/70; G03B 21/26; F16M 1/00; G03B 27/62
[52] U.S. Cl. .................................... 355/43; 354/76; 353/30; 248/662; 355/46; 355/75
[58] Field of Search ............. 355/40, 43, 39, 20, 355/57, 60, 41, 42, 75, 65, 46; 354/76, 77; 248/11, 23, 178; 353/30, 87, 94; 248/651, 652, 660–662, 656, 657

[56] References Cited

U.S. PATENT DOCUMENTS

| | | | |
|---|---|---|---|
| 2,985,064 | 5/1961 | Dimmick | 355/43 |
| 3,111,887 | 11/1963 | Alexander | 354/76 X |
| 3,677,146 | 7/1972 | Nielsen | 355/20 X |
| 3,796,487 | 3/1974 | Voorhees | 355/43 X |
| 3,947,190 | 3/1976 | Otubo et al. | 355/43 X |
| 4,012,021 | 3/1977 | Duceppe | 248/23 |
| 4,059,355 | 11/1977 | Fritsch | 355/43 |

*Primary Examiner*—L. T. Hix
*Assistant Examiner*—W. J. Brady
*Attorney, Agent, or Firm*—J. T. Cavender; Wilbert Hawk, Jr.; George J. Muckenthaler

[57] ABSTRACT

A microfiche recorder capable of optically combining, aligning and superimposing at least three independent images from a computer controlled CRT, a raster plate which is size and position coordinated with the CRT, and a multiple, random access graphic image projector. The CRT, raster plate and projector are arranged along angularly inclined optical axes and optics are provided which combined and optically align the respective images and reduce their sizes by differing factors to a common microfiche recording size.

2 Claims, 5 Drawing Figures

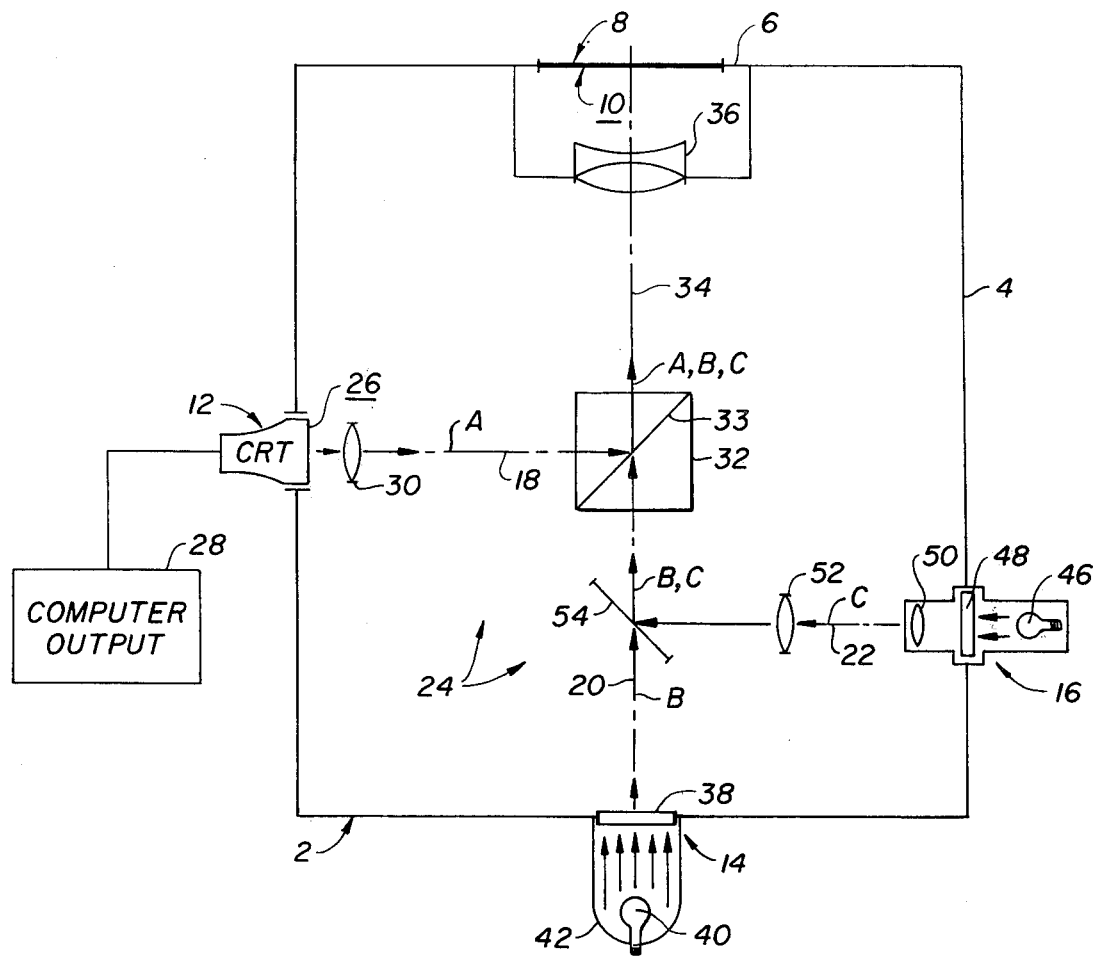
FIG._1.
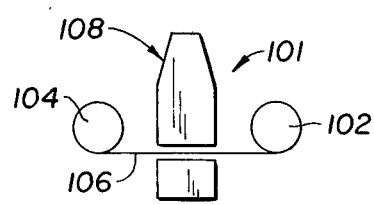
FIG._4.
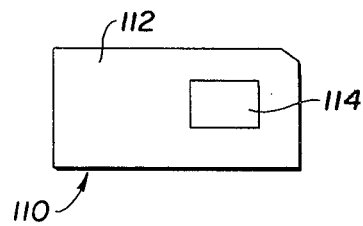
FIG._5.

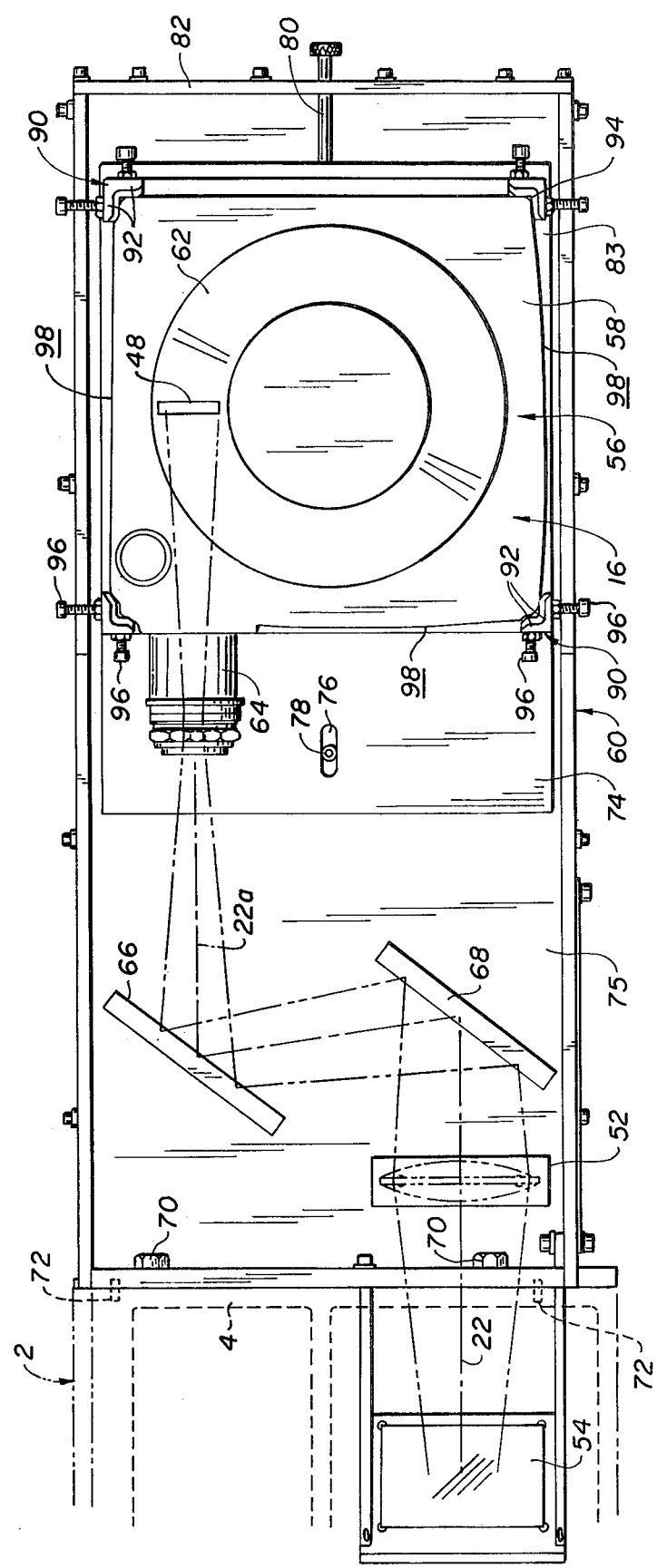

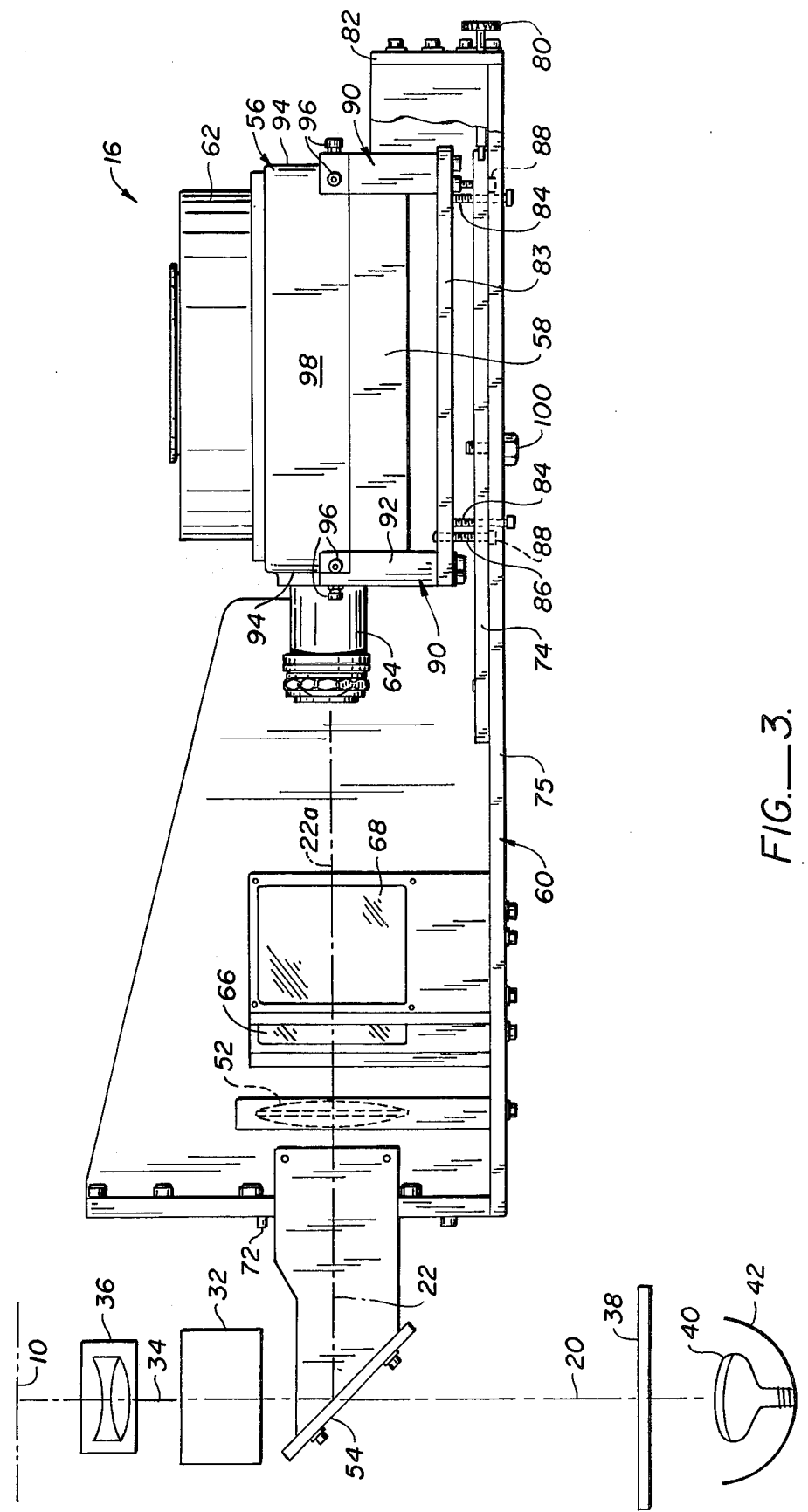
FIG._3.

APPARATUS FOR RECORDING MULTIPLE, SUPERIMPOSED, INDEPENDENT IMAGES ON MICROFILM

BACKGROUND OF THE INVENTION

Today's data storage and retrieval systems rely heavily on the recording of data on microfiche. Microfiche drastically reduces required storage space for the data, makes the data easily accessible, is relatively inexpensive, and lends itself to fast, convenient and inexpensive duplication of the microfiche and the data recorded thereon for distribution to often large numbers of users. U.S. Pat. No. Re 29,254 discloses a particularly advantageously constructed microfiche recorder.

The referenced patent primarily relates to the mechanical construction of the recorder and the manner in which the microfiche is rectilinearly advanced past a recording station so that multiple, relatively small images can be recorded on the fiche.

Normally, the bulk of the data recorded on the microfiche is flashed onto a cathode ray tube (hereinafter CRT) which in turn is driven by the output received from a computer or other suitable data storage and retrieval system. The CRT display is focused onto the microfiche and is there photographically recorded. Typically, each CRT display comprises one standard computer printout page. After the fiche has been recorded it can be placed into a microfiche reader where the recorded photographic images are displayed on a viewing screen.

Usually, the data recorded from a CRT screen comprises alpha-numeric characters only. To facilitate the reading of the recorded data, raster images were heretofore frequently superimposed. The raster images are obtained from so-called "form slides" which comprise an arrangement of horizontal and/or vertical raster lines that correspond with the data lines and columns on the CRT. Such a form slide is precision mounted on the recorder and, when desired, its image is projected onto the microfiche and is superimposed over the projected CRT image so that the finished microfiche image not only includes the data but also the raster lines to facilitate the subsequent reading of the data.

Microfiche recording and reading is, of course, not limited to the use of alpha-numeric characters. For example, other graphic information such as drawings, pictures and the like which accompany alpha-numeric information are ideally included on the microfiche recorder. Normally, however, this substantially complicates the CRT display and frequently it is not possible to satisfactorily generate drawings and the like on a CRT screen from computer output data. Additional problems are encountered when the graphic or alpha-numeric information require revisions, separation, updating, etc. For example, engineering drawings and parts lists frequently require changing and/or updating of the latter due to design changes, changes in parts designations for different sizes and/or model numbers, an alpha numeric printout in different languages to accompany a given drawing and the like. To store all this information in computers for display on a CRT screen requires very large storage capacities. Moreover, the output of the graphic data is of a relatively low quality.

As a consequence, graphic illustrations accompanying alpha-numeric information was heretofore not normally recorded on the same microfiche. Instead, it was separately supplied on form drawings (which themselves could be on microfiche) which had to be stored at each potential point of use. They occupy additional scarce and expensive storage space and significantly complicated the data retrieval.

From the foregoing it will be apparent that large users of alpha-numeric information accompanying graphic illustrations, e.g. drawings, could use microfiche as a low cost, fast and reliant data storage and retrieval system to only a limited extent. Government, the military and large parts inventory and supply organizations are most severely affected and handicapped by this problem.

SUMMARY OF THE INVENTION

The present invention greatly increases the versatility of microfiche recorders by providing prior art recorders with the means for freely combining graphic informations, say drawings, with an alpha-numeric computer output displayed on a CRT screen and with a form slide raster. In this manner, alpha numeric data stored in the computer is readily combined with different graphic displays. The present invention makes this combination particularly advantageous since it preferably employs readily available, low cost 35 mm slide projectors for generating the graphic display that is to be combined with the computer output data. The present invention thereby greatly reduces the cost and bulk for storing and retrieving required data, particularly in instances in which such data must be supplied to multiple users.

Generally speaking, a microfiche recorder constructed in accordance with the present invention comprises independent, first, second and third spaced apart opitcal image generators arranged along angularly offset, e.g. perpendicular axes. The first generator comprises a CRT for the display of computer output data on a screen. The second generator comprises the earlier discussed form slide for generating a raster for the (alpha-numeric) CRT output and the third generator stores a multiplicity of photographic images, preferably on 35 mm slides. As an alternative to a slide projector, the graphic images can be stored on a roll of microfilm or on aperture cards which use appropriately constructed projectors.

The third image generator preferably comprises a standard, commercially available slide projector which includes a slide tray that provides random access to any of the slides stored therein, that is in which the slides can be displayed in any desired order. The slide image (hereinafter "graphic image") is focused on a field lens, which preferably is spaced from an image plane for the microfiche by a distance equal to the distance between such plane and the form slide.

The present invention further provides optical means that is operatively coupled with the image generators for projecting the images therefrom to and for merging the projected images in the image plane of the microfiche. The optical means includes image reducing means for each generator which reduces each of the respective images by the required factor to a common microfiche image size at the image plane, and means for aligning the images with respect to each other and the image plane. The aligning means includes a plurality of reflectors arranged to project images from the generators onto a common optical path which terminates in the image plane of the microfiche.

In the preferred embodiment of the invention, the graphic image is first focused in the field lens and enlarged so that it has the same overall image size as the form slide. The optics then combines the form slide image and the graphic image and reduces both by a common factor to the desired microfiche image size. In this manner, the optics is simplified and makes a more convenient, economical and aesthetically pleasing packaging of the slide projector and the associated components possible.

In the preferred embodiment of the invention, all image generators and the optics are mounted on an optical bench or microfiche recorder frame which rigidly positions them and retains their mutual alignment. Moreover, to increase the versatility of the recorder of the present invention, the graphic image projector is mounted on an independent optical bench which can be added to or deleted from the recorder as a whole as is required in a given situation.

To enhance the economy of a microfiche recorder constructed in accordance with the present invention, the slide projector is a relatively inexpensive, commercially available, standard projector. Such projectors, though entirely satisfactory in their optical characteristics, have a relatively low alignment accuracy. To enable the use of such a projector with the high precision image alignment required in microfiche recorders, the projector is mounted on its optical bench with adjustment means that permit the adjustment of the relative orientation of the projector, and thereby of its optical axis in a plurality of at least two, mutually perpendicular directions. In this manner, the projector can be initially installed and, thereafter, it can be precisely aligned with the other image generators by moving it in horizontal or vertical directions and/or tilting it about horizontal and vertical axes. Additionally, means is provided for mechanically locking the projector in its ultimately aligned position.

From the foregoing, it will be apparent that the present invention significantly increases the usefulness of prior art microfiche recorders while substantially reducing the bulk of the stored data, both in the computer and at the point of ultimate use. All this is accomplished with a relatively low cost modification of the recorder.

BRIEF DESCRIPTION OF THE DRAWINGS

FIG. 1 is a schematic diagram which illustrates the manner in which the present invention optically combines three independent images and projects them in precise mutual alignment onto a microfiche;

FIG. 2 is a fragmentary plan view which illustrates the manner in which a graphic image slide projector is installed on a microfiche recorder;

FIG. 3 is a side elevation of the detail illustrated in FIG. 2;

FIG. 4 is a schematic illustration of another embodiment of the invention employing 35 mm roll film as the storage medium for the graphic images; and FIG. 5 is a schematic illustration of a further embodiment of the present invention employing aperture cards as the storage medium for graphic images.

DESCRIPTION OF THE PREFERRED EMBODIMENTS

Referring first to FIG. 1, a schematically illustrated microfiche recorder 2 includes a frame 4 to which is mounted a holder 6 for a microfiche 8. The emulsion side of the microfiche 8 is disposed in a microfiche image plane 10. The holder 6 is rectilinearly movable and the recorder as a whole is constructed as is disclosed, for example, in U.S. Pat. No. Re. 29,254. First, second and third image generators 12, 14 and 16 are mounted to the frame 4 for the projection of images A, B and C, respectively, along angularly inclined, e.g. perpendicular optical axes 18, 20 and 22. Image combining and reducing optics 24 focus the images in microfiche image plane 10, reduce them to a common image and further bring the images into mutual alignment.

More specifically, the first image generator 12 is a CRT having a CRT screen 26 on which output data from a computer 28 or a like data storage and retrieval system is visually displayed in a conventional manner. The CRT screen image A is imaged along optical axis 18 through a conventional beam combiner cube 32 which includes a reflecting surface 33 that reflects image A 90° and directs it along a perpendicular, common optical image axis 34 towards the microfiche image plane 10. A focusing lens 36 mounted to frame 4 focuses image A in the microfiche image plane 10. The beam combiner 32 is commercially available from the Melles Griot Company of Irvine, Calif.

The second image generator 14 comprises a form slide defined by a raster plate 38 carried by frame 4, and precision aligned with its optical axis 20. Preferably, the raster plate 38 is removably mounted so that it can be replaced with plates of differing raster designs as may be necessary. A light source 40 with a reflector housing 42 is mounted to the frame and illuminates the raster plate 38. The raster image B is imaged along optical axis 20 through beam combining cube 32 and reflecting surface 33 (which is transparent along axis 20) where the raster image B is combined with the CRT image A for aligned, superimposed focusing in microfiche image plane 10.

The third image generator 16 preferably comprises a photographic slide projector (not shown in FIG. 1) and generally provides a light source 46 which illuminates a graphic image C on a 35 mm slide 48, for example. A lens 50 enlarges and focuses the graphic image C on a field lens 52. The field lens 52 preferably is a bi-convex 100 mm diameter lens with a 200 mm focal length and is commercially available from the Melles Griot Company of Irvine, California, under the trade designation 01 LDX 223.

A beam splitter or partially reflecting mirror 54 disposed at the intersection of optical axes 20 and 22 reflects graphic image C from the field lens 52 at a right angle and in alignment with common optical axis 34 towards microfiche image plane 10. The beam splitter 54 further permits passage of raster image B from the form slide and thus combines both images B and C optically upstream of the image combining cube 32. In the preferred embodiment of the present invention the field lens 52 and raster plate 38 are equidistant from image plane 10 and since the raster plate image B and the graphic image C (at the field lens) have the same size they are reduced by a common factor to simplify the construction of the optics.

Referring now to FIGS. 1-3, the construction and mounting of the third image generator 16 and its associated optics can be set forth in greater detail. As above-mentioned, the third generator 16 preferably comprises a standard, commercial grade 35 mm slide projector 56 such as is available in a variety of styles from the Eastman Kodak Company of Rochester, New York. The projector 56 includes a main body 58 that is preferably adjustably mounted to an optical bench 60 which is independent of, secured to, and precision aligned with recorder frame 4 as is further discussed below. The projector 56 includes the normal slide storage tray such as a slide storage carousel 62 which mounts a multiplicity, say 80 slides and which can be rotated about a vertical axis (as shown in FIG. 2) to align any one of the slides 48 with an objective 64 of the projector. The objective 64 is selected so that it focuses the graphic slide image C in field lens 52 for the subsequent refocusing thereof in microfiche image plane 10 as above described. To reduce the overall length of projector bench 60, a pair of mirrors 66, 68 divert optical path 22a from projector 56 at right angles in an otherwise conventional manner.

Since it is not always necessary to provide a microfiche recorder with the capability of superimposing graphic images on the microfiche, optical bench 60 is demountably secured to microfiche recorder frame 4 with bolts 70. Precision locators such as dowel pins 72 position and align the optical bench with the recorder frame.

Since the alignment characteristics of standard slide projectors is relatively poor while the alignment requirements for the three images A, B & C superimposed on microfiche 8 is high, projector 56 is preferably mounted to a base 74 which is longitudinally (parallel to optical axis 22) slidable over a bench plate 75 of optical bench 60 within the confines of an elongate slot 76 engaged by an upright post 78 mounted to the bench plate. A rearwardly extending set screw 80 is anchored in the base 74 and engages a threaded aperture (not separately shown) in an end wall 82 of the optical bench 60. Thus, upon turning the set screw 80 in one or the other direction the base 74 can be moved forward or rearward generally parallel to optical axis 22.

Three vertically oriented, spaced apart positioning bolts 84 are threadably engaged in correspondingly arranged apertures in base 74, protrude vertically above the base and have a head that is accessible through access openings (not separately shown in the drawings) in bench plate 75, so that the positioning bolts 84 can be rotated from beneath the optical bench 60. Closely adjacent to the positioning bolts 84 are lock bolts 86 the upper ends of which are threaded into appropriately located bores in a platform 83 which supports projector 56. The lock bolts 86 protrude through holes in base 74 and heads 88 of the lock bolts engage the underside of the base and are disposed within appropriately located and shaped cutouts in the bench plate 75.

The vertical position bolts 84 are used to level the platform 83 and therewith the projector 56 relative to the optical bench 60. By extending or retracting the appropriate position bolts 84, it is possible to vertically raise or lower the projector 56 relative to the optical bench 60 or to tilt it about horizontal axes to correspondingly adjust the orientation of optical axis 22 in a vertical plane.

To enable the adjustment and re-orientation of optical axis 22 in a horizontal plane four upright posts 90 having perpendicular legs 92 are anchored to the corners of platform 83 and they are positioned so that projector body 58 can be lowered between the posts 90 and corners 94 of the projector 56 are disposed within the confines of post legs 92. Each leg 92 of each post 90 includes a set screw 96 which can be tightened against sides 98 of the projector 56. By appropriately tightening and loosening the set screws 96, the projector 56 can be moved linearly in a direction perpendicular to optical axis 22 in an essentially horizontal direction and it can further be tilted about vertical axes to enable the precision alignment of optical axis 22 with axes 20 and 34.

The installation and operation of slide projector 56 should now be apparent. To briefly summarize it, when a graphic image generator 16 is to be added to a microfiche recorder 2, optical bench 60 is initially attached to recorder frame 4 by aligning the dowel pins 72 with appropriately located dowel holes (not shown in the drawings) and then securing bolts 70. Thereafter, projector 56 is installed on platform 83 which in turn is mounted to base plate 74 with position bolts 84 and lock bolts 86. After the installation of mirrors 66, 68, field lens 52 and beam splitter 54, optical axis 22 of the projector is aligned with the common optical axis 34 that terminates in microfiche image plane 10. Vertical adjustments are made by appropriately turning vertical position bolts 84 while horizontal adjustments of the projector are made with set screws 96 in posts 90. While the tightened set screws 96 automatically lock the projector 56 against further relative movements in horizontal directions, it is necessary to tighten lock bolts 86 to secure platform 83 and therewith projector 56 against relative vertical movements after the optical axis 22 of the projector has been brought into the proper alignment.

The focal distance between the projector objective 64 and field lens 52 is set by appropriately turning set screw 80 to move the base plate 74 towards or away from the field lens 52 as required for proper adjustment of the magnification. A further lock bolt 100 is then tightened to lock the base plate 74 and therewith the projector 56 in the exact position. The projector 56 is now ready for use.

Each time a graphic image C is to be combined with a CRT image A for recordation on microfiche 8, the appropriate slide 48 is aligned with projector objective 64 and illuminated to project the graphic image C in proper alignment with the CRT image A (and raster plate image B) onto the microfiche 8. It will be apparent that the selection of any graphic image C in the slide storage carousel 62 is an easy matter, requires almost no time and, most importantly, is accomplished without large expenditures in the construction of the recorder or the capacity and versatility of the computer 28 which feeds CRT 12.

Referring now briefly to FIGS. 1–5, in an alternative embodiment of the invention, slide projector 56 shown in FIG. 3 is replaced with the schematically illustrated microfilm projector 101 shown in FIG. 4. Such projectors are well known in the art and are, therefore, not described here in detail. Suffice is to say that it includes a pair of microfilm reels 102, 104 which store a length of (35 mm) microfilm 106. By rotating one or the other reel the individual microfilm frames (not separately shown) can be advanced past an objective 108 of the projector 101. The mounting and operation of the microfilm projector 101 is similar to that of the slide projector 56 discussed above.

In a yet further embodiment of the invention, the graphic images C are stored on aperture cards 110 instead of the earlier discussed slides 48. Such aperture cards 110 are presently in wide use and comprise the conventional computer card 112 to which is mounted and exposed, e.g. 35 mm film 114 which carries the graphic image C. The aperture card 110 can be mounted in a special aperture card projector (not separately shown) or they can be individually inserted into suitably constructed holders mounted to the optical bench 60 shown in FIGS. 2 and 3.

We claim:

1. A microfiche recorder comprising in combination:
   a frame including means for positioning a microfiche in an image plane;
   a CRT screen mounted to the frame and means for displaying thereon computer output data;
   a form slide mounted to the frame and including a raster plate for superimposition with the data displayed on the CRT;
   first optical means for projecting images of the raster plate and of the CRT screen along first and second optical axes onto the microfiche image plane and including lens means for reducing the image size of the CRT and the raster plate so as to render their image sizes in the image plane identical, and reflector means in the first and second optical axes for changing the direction of at least one of them and optically aligning the images with each other so as to effect their precise superimposition on the microfiche;
   an optical bench constructed independently of the frame and means for precision aligning the bench with the frame, and further means for demountably securing the bench to the frame;
   a slide projector mounted to the optical bench and including means for storing a plurality of photographic slides each carrying a graphic image, an objective for projecting the graphic images along a third optical axis, and means for selectively registering any one of the slides on the storage means with the projecting means;
   a field lens positioned in the third optical axis and disposed in the focal plane of the objective for refocusing the graphic image in the microfiche image plane;
   slide merging optics disposed in the third optical axis downstream of the field lens for combining and optically aligning the graphic image with at least one of the projected images of the CRT screen and the raster plate so that the projected graphic image is in optical alignment with the projected images from the screen and the raster plate; and
   adjustment means permitting the multi-directional adjustment of the slide projector in relation to the optical bench of said frame for optically aligning the third optical axis with the first and second optical axes, the adjustment means including a base slidably carried by said optical bench, and a platform spaced from said base for supporting said slide projector, vertical adjustment means comprising a plurality of vertically adjustable positioning members connected with the optical bench and with the platform for supporting and vertically positioning the slide projector for moving the projector in a vertical direction and for tilting the projector about a horizontal axis, horizontal adjustment means for moving the slide projector relative to the optical bench in a generally horizontal direction, the last mentioned means including a plurality of upright post means anchored to said platform and disposed closely adjacent to and spaced from a body of the slide projector, horizontally movable means engaging the post means and constructed to engage the sides of the slide projector and selectively linearly and pivotally move the slide projector in a plurality of generally horizontal directions, means operably connecting the base and the optical bench for slidably moving the base and the slide projector generally parallel to the optical bench to facilitate the proper magnification of the graphic image in the field lens, and means for locking the slide projector against further vertical and horizontal movements relative to the vertical positioning members and the post means after the third optical axis has been aligned with the first and second optical axes.

2. A microfiche recorder comprising in combination:
   a frame including means for positioning a microfiche in an image plane;
   a CRT screen mounted to the frame and means for displaying thereon computer output data;
   a form slide mounted to the frame and including a raster plate for superimposition with the data displayed on the CRT;
   first optical means for projecting images of the raster plate and of the CRT screen along first and second optical axes onto the microfiche image plane and including lens means for reducing the image size of the CRT and the raster plate so as to render their image sizes in the image plane identical, and reflector means in the first and second optical axes for changing the direction of at least one of them and optically aligning the images with each other so as to effect their precise superimposition on the microfiche;
   an optical bench, means for precision aligning the bench with the frame, and means for demountably securing the bench to the frame;
   a standard commercially available 35 mm slide projector mounted to the bench and including means for storing a plurality of 35 mm slides each carrying a graphic image, an objective for projecting the graphic images along a third optical axis, and means for selectively registering any one of the slides on the storage means with the projecting means;
   lens means positioned in the third optical axis for focusing the graphic image in the microfiche image plane and for reducing the graphic image size to correspond to the image size of the CRT screen and the raster plate on the microfiche; and
   adjustment means permitting the multi-directional adjustment of the slide projector for aligning its optical axis with the third optical axis, the adjustment means including a base carried by and movable relative to the optical bench, the adjustment means including;
   vertical adjustment means comprising a plurality of vertically adjustable positioning members connected with the base, supporting and vertically positioning the slide projector, and means for locking the slide projector to the vertical positioning members to prevent relative vertical movements between them;
   horizontal adjustment means for moving the slide projector relative to the optical bench in a generally horizontal direction, the last mentioned means including a plurality of upright post means disposed closely adjacent to and spaced from a body of the slide projector, platform means secured to and interconnecting the post means for supporting the slide projector and spaced from said base by means of said positioning members, and said locking means engageable with the base and with the platform means, horizontally movable means engaging the post means and constructed to engage the sides of the slide projector and selectively move the slide projector in a plurality of generally horizontal directions, and means for locking the slide projector against further horizontal movement relative to the post means after the slide projector has been placed in a desired horizontal position; and means operatively connecting the base with the optical bench for moving the base, and therewith the slide projector generally parallel to the optical bench to facilitate the proper magnification of the graphic image in the microfiche image plane.

* * * * *